United States Patent [19]
Sakata

[11] Patent No.: US 6,266,084 B1
[45] Date of Patent: Jul. 24, 2001

[54] IMAGER CONNECTED TO EXTERNAL PROCESSOR BY SINGLE CABLE COMPRISING TWO COAXIAL CABLES AND FOUR SIGNAL LINES

[75] Inventor: Tsuguhide Sakata, Sagamihara (JP)

[73] Assignee: Canon Kabushiki Kaisha, Tokyo (JP)

[*] Notice: Subject to any disclaimer, the term of this patent is extended or adjusted under 35 U.S.C. 154(b) by 0 days.

[21] Appl. No.: 08/893,239

[22] Filed: Jul. 15, 1997

[30] Foreign Application Priority Data

Jul. 26, 1996 (JP) .................................................. 8-197647

[51] Int. Cl.[7] .............................. H04N 5/225; H05K 9/00
[52] U.S. Cl. .............................................. 348/207; 174/32
[58] Field of Search .................................... 348/143, 207, 348/211, 212, 213, 232, 13, 14, 15; 333/1, 260; 174/32, 34, 36; H04N 7/14, 7/15

[56] References Cited

U.S. PATENT DOCUMENTS

| 4,174,526 | * | 11/1979 | Geurts ................................... 358/219 |
| 5,345,592 | * | 9/1994 | Woodmas ............................... 455/3.3 |
| 5,623,304 | * | 4/1997 | Ota et al. ............................. 348/143 |
| 5,777,664 | * | 10/1995 | Sakata et al. ........................ 348/16 |
| 5,815,205 | * | 2/1996 | Hashimoto et al. ................. 348/373 |
| 5,821,995 | * | 10/1998 | Nisekawa ............................. 348/212 |
| 5,850,257 | * | 5/1995 | Sakata ................................. 348/241 |
| 5,896,171 | * | 2/1997 | Suzuki ................................. 348/211 |

FOREIGN PATENT DOCUMENTS

| 184072 | * | 8/1986 | (JP) | ................................. H04N/7/14 |
| 62-276968 | * | 1/1987 | (JP) | ................................. H04N/5/265 |
| 362067975A | * | 3/1987 | (JP) | ................................. H04N/5/232 |

* cited by examiner

Primary Examiner—Wendy R. Garber
Assistant Examiner—Alicia M. Harrington
(74) Attorney, Agent, or Firm—Fitzpatrick, Cella, Harper & Scinto (57) ABSTRACT An image pickup system in which the number of cables for connecting a video camera, a headset and a personal computer are reduced. The video camera and an expansion board attached to the personal computer are connected by a single cable through 8-pin DIN connectors. Through this cable, a synchronizing signal, a control signal, and a sound signal (which is sent from an external source) are transmitted to the video camera from the expansion board. Further, a headset (having earphones and a microphone) worn by the user of the video camera is connected to the video camera through another cable. Through this cable, a sound signal from the external source is transmitted to the earphones, while a sound signal from the user input through the microphone is sent to the expansion board via the video camera and the cable for connecting the camera and the board.

21 Claims, 10 Drawing Sheets

IMAGER CONNECTED TO EXTERNAL PROCESSOR BY SINGLE CABLE COMPRISING TWO COAXIAL CABLES AND FOUR SIGNAL LINES

BACKGROUND OF THE INVENTION

1. Field of the Invention

The present invention relates to an image pickup apparatus suitably used for a videoconference system, and an image processing apparatus for processing picked-up video images. The invention is also concerned with an image pickup system formed by connecting the above image pickup apparatus and the image processing apparatus.

2. Related Background Art

Figure 10:
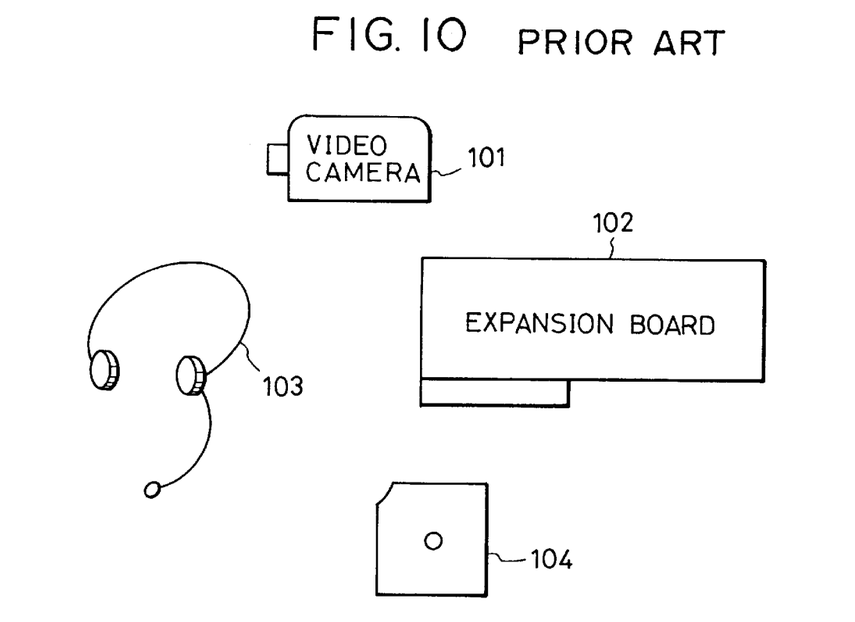
FIG. 10 is a schematic diagram illustrating a conventional image pickup system used in a videoconference system.

Hitherto, as a videoconference system using the above type of apparatus, conference-type large-sized cabinet-accommodated systems, and cart-type systems housed in a wheeled cart are the mainstream. Along with widespread use of computers (personal computers), desktop videoconference systems using personal computers have appeared and are currently in the limelight. This system is constructed, as illustrated in FIG. 10, of a video camera 101, an expansion board 102 for a personal computer (which incorporates sound and video images, performs data expansion and compression, and executes communication control), a headset 103, and software 104.

Figure 11:
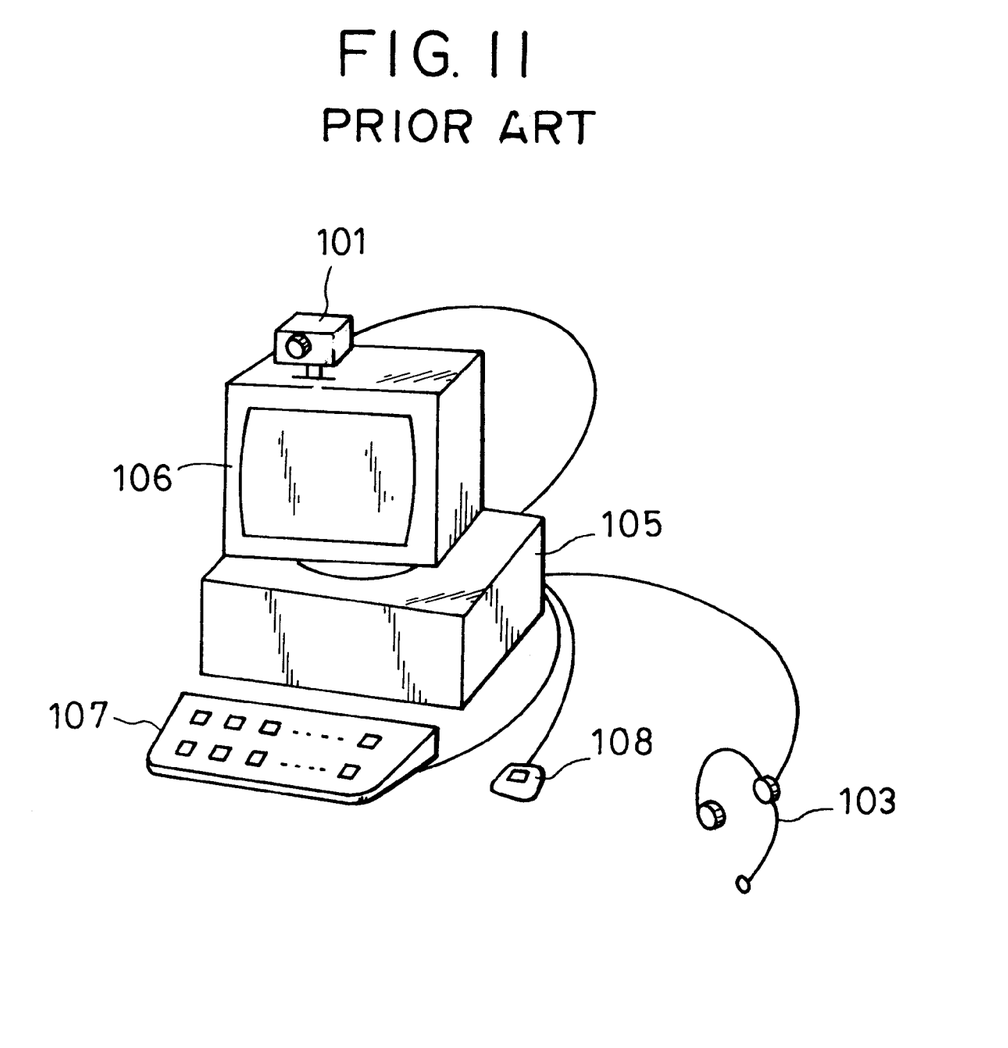
FIG. 11 is an external view of the conventional image pickup system.

FIG. 11 is an external view illustrating the construction of a desktop videoconference system formed by connecting the above elements 101 through 104 to a personal computer. In FIG. 11, the system further includes the main unit 105 of the personal computer, a personal computer monitor 106, a keyboard 107, and a mouse 108.

Figure 12:
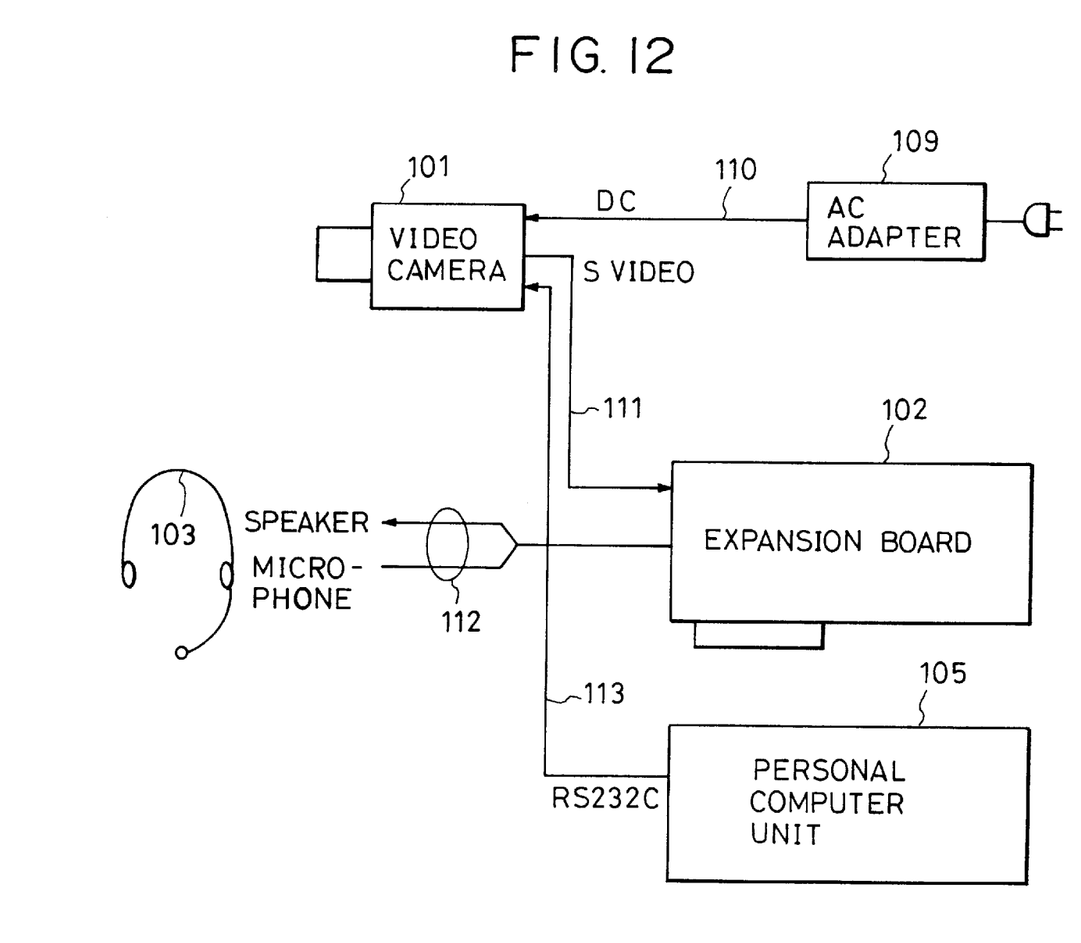
FIG. 12 is a block diagram of the known image pickup system.

Electrical connection of the above-described components is shown in FIG. 12. An explanation will now be given with reference to FIG. 12 of an example in which the communication camera VC-C1 (which was invented by the present inventor and became commercially available in 1994) is used as the video camera 101.

The video camera 101 is equipped with a pan-tilt mechanism, a video output, an S-video output, a sound line output, a direct-current (DC) power input, and an RS232C control terminal (none shown). For supplying DC power to the video camera 101, a DC power supply line (a DC power supply and a ground) 110 is first connected to the video camera 101 via an AC adapter 109. Among the video outputs of the video camera 101, for example, the S-video output terminal, is then connected to an S video input terminal provided for the expansion board 102 via a video cable 111. Subsequently, for controlling various functions of the video camera 101, such as pan, tilt, and zoom, an RS232C terminal of the personal computer unit 105 and an RS232C terminal of the video camera 101 are connected by the use of an RS232C cable 113. With respect to sound, since a microphone is not built into the video camera 101, a headset 103 having a microphone and a speaker is connected to the expansion board 102 using a headset cable 112.

In this manner, electrical connections with respect to (1) a video camera power supply, (2) video signals, (3) control signals, and (4) sound signals have been completed. After the personal computer is switched on, a predetermined software program is run to enable this system to function as a desktop videoconference system. Operation of the videoconference and connection of the system to a communication line, such as an integrated services digital network (ISDN), are irrelevant to the present invention, and an explanation thereof will thus be omitted.

The number of connecting cables used for establishing the above-described electrical connections can be summarized as follows:

(1) two power supply cables, i.e., a DC power supply and a ground (GND);

(2) four video cables, i.e., Y and C video signal cables and the respective GNDs;

(3) eight RS232C cables, (however, the minimum number in synchronous serial transmission is four, i.e., Tx, Rx, clock and GND); and between the headset 103 and the expansion board 102, (4) three headset cables, i.e., a microphone signal line, a speaker signal line, and a GND.

Accordingly, four types of cables and at least 13 signal lines are required in total.

However, the aforedescribed conventional system presents the following problems.

(1) The three cables, such as the power supply cable 110, the video cable 111, and the RS232C cable 113 are separately connected to the video camera 101, thereby impairing the external appearance from an aesthetic point of view and also lowering reliability. In short, a disconnection of any one of the cables will spoil the operation.

(2) The two cables, such as the video cable 111 and the headset cable 112, are also separately connected to the expansion board 102, thereby marring the external appearance of the back side of the personal computer unit 105 at which the connecting portions with the above cables 111 and 112 are disposed.

(3) The RS232C cable 113 for controlling the video camera 101 is unfavorably connected to the RS232C terminal of the personal computer unit 105 which may be required for connecting to another device, for example, a modem or a printer.

(4) The headset 103 is preferably disconnected and stored in, for example, a drawer when not in use from a sanitary point of view. The headset cable 112, however, is connected to the back side of the personal computer through the expansion board 102 and is not easy to disconnect.

(5) The AC adapter 109 is not always coupled to the same AC power supply line as the line for the personal computer unit 105. It is thus necessary to check that power is positively supplied to the AC adapter 109 when AC power is supplied to the computer unit 105.

SUMMARY OF THE INVENTION

Accordingly, it is an object of the present invention to provide an image pickup apparatus, an image processing apparatus, and an image pickup system, all of which are suitable for desktop videoconferencing, free from the aforedescribed problems.

In order to achieve the above object, according to a first aspect of the present invention, there is provided an image pickup apparatus comprising: image pickup means for picking up an image of a subject and outputting a video image signal; a first terminal for receiving a first control signal; a second terminal for receiving a synchronizing signal; first control means for generating a second control signal based on the received first control signal and the synchronizing signal, and also for performing overall control; adding means for adding the second control signal to the video image signal; a third terminal for outputting the video image signal to which the second control signal is added; and a fourth terminal for receiving a power supply voltage.

According to a second aspect of the present invention, there is provided an image processing apparatus comprising: a first terminal for receiving a video image signal; image processing means for processing the received video image signal; synchronizing-signal generating means for generating a synchronizing signal; a second terminal for outputting the synchronizing signal; second control means for generating a first control signal based on the synchronizing signal, and also for performing overall control; a third terminal for outputting the first control signal to the exterior; power supply means for supplying a power supply voltage; and a fourth terminal for outputting the power supply voltage.

According to a third aspect of the present invention, there is provided an image pickup system comprising: an image pickup apparatus including image pickup means for picking up an image of a subject and outputting a video image signal, a first terminal for receiving a first control signal, a second terminal for receiving a synchronizing signal, first control means for generating a second control signal based on the received first control signal and the synchronizing signal, and also for performing overall control, adding means for adding the second control signal to the video image signal, a third terminal for outputting the video image signal to which the second control signal is added, a fourth terminal for receiving a power supply voltage, and first connector means having the first through fourth terminals; an image processing apparatus including a fifth terminal for receiving a video image signal, image processing means for processing the received video image signal, synchronizing-signal generating means for generating a synchronizing signal, a sixth terminal for outputting the synchronizing signal, second control means for generating a first control signal based on the synchronizing signal, and also for performing overall control, a seventh terminal for outputting the first control signal to the exterior, power supply means for supplying a power supply voltage, an eighth terminal for outputting the power supply voltage, and second connector means having the fifth through eighth terminals; and a cable having at both ends third and fourth connector means respectively connected to the first and second connector means so as to couple a corresponding pair of terminals respectively selected from the first through fourth terminals and the fifth through eighth terminals.

In the image pickup apparatus according to the first aspect of the present invention, the second control signal generated by the first control means is superimposed on a video image signal obtained by picking up an image of a subject by the image pickup means, and then, the superimposed signal is output from the third terminal. The first control means produces the second control signal based on the first control signal and the synchronizing signal input from the first and second terminals, respectively. The respective means receive the power supply via the fourth terminal.

In the image processing apparatus according to the second aspect of the present invention, the video image signal input through the fifth terminal is processed by the image processing means. Moreover, the synchronizing signal generated by the synchronizing-signal generating means is output from the sixth terminal, and the second control means generates the first control signal based on the synchronizing signal and outputs it from the seventh terminal. The power supply means outputs a power supply voltage through the eighth terminal.

The image pickup system according to a further aspect of the present invention operates in the following manner. In the image pickup apparatus, the second control signal generated by the control means is superimposed on a video image signal obtained by picking up an image of a subject by the image pickup means, and then, the superimposed signal is transmitted to the image processing apparatus from the third terminal through the cable. The first control means receives through the first and second terminals the first control signal and the synchronizing signal, respectively, sent from the image processing apparatus via the cable, and generates the second control signal based on the first control signal and the synchronizing signal. Additionally, a power supply voltage from the image processing apparatus is fed to the image pickup apparatus via the fourth terminal. In the image processing apparatus, a video image signal input from the image pickup apparatus through the fifth terminal via the cable is processed in the image processing means. Further, the synchronizing signal produced in the synchronizing-signal generating means is output from the sixth terminal and sent to the image pickup apparatus via the cable, and also, the second control means produces the first control signal based on the synchronizing signal and outputs it from the seventh terminal to the image pickup apparatus via the cable. Additionally, the power supply means outputs a power supply voltage from the eighth terminal and supplies it to the image pickup apparatus via the cable.

Further objects, features and advantages of the present invention will become apparent from the following description of the preferred embodiments with reference to the attached drawings.

DESCRIPTION OF THE PREFERRED EMBODIMENTS

Figure 1:
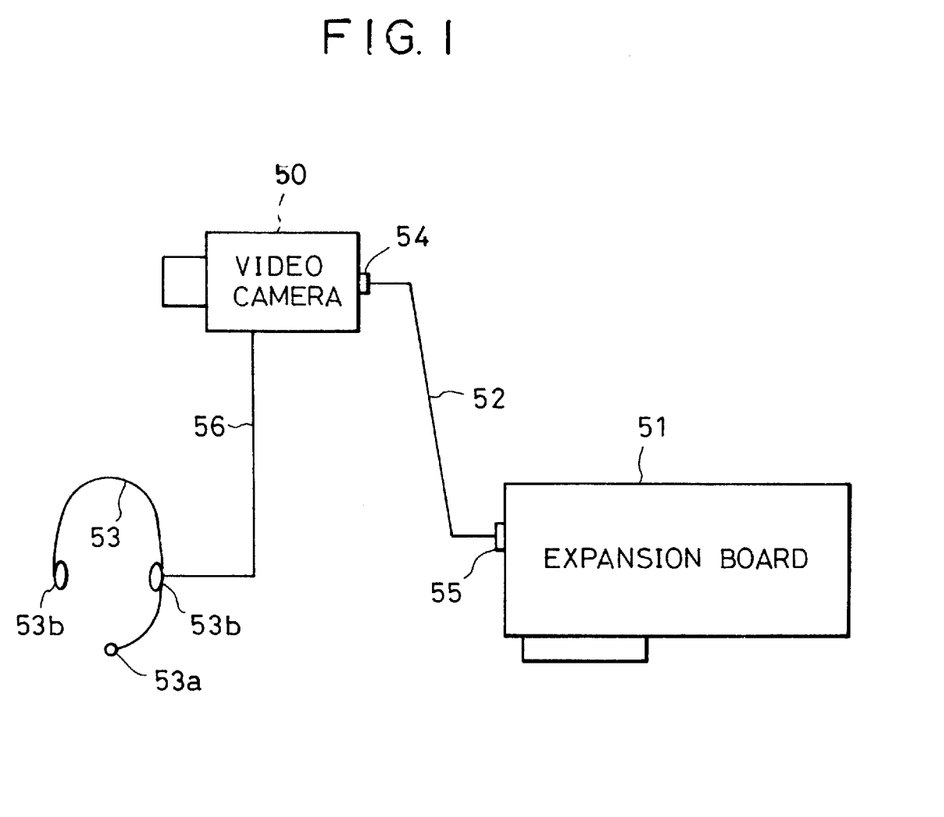
FIG. 1 is a block diagram illustrating a first embodiment of the present invention.

Referring to a block diagram illustrating a first embodiment of the present invention shown in FIG. 1, there are shown a video camera 50, and an expansion board 51 used as an image processing apparatus attached to a personal computer. The expansion board 51 incorporates video and sound data from the video camera 50, performs data expansion and compression, and executes communication control. A united cable 52, which is a feature of the present invention, is used for connecting the video camera 50 and the expansion board 51. Male and female connectors 54 and 55 serve to couple the united cable 52 to the video camera 50 and the expansion board 51; the female connectors, for example, are provided at the video camera 50 and the expansion board 51, while the male connectors are disposed at both ends of the cable 52. In FIG. 1, there are also shown a headset 53 having a microphone 53a and earphones (speaker) 53b, and a headset cable 56 for connecting the headset 53 to the video camera 50.

Figure 2:
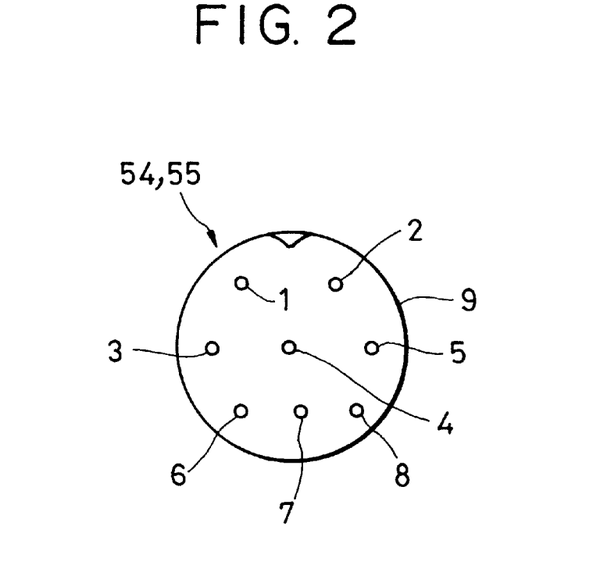
FIG. 2 is a schematic diagram illustrating the connecting portions of an 8-pin mini DIN connector.

FIG. 2 illustrates the connecting portions of the above-described connector 54 or 55, and in this embodiment, an 8-pin mini DIN connector is used as the connector 54 or 55. In FIG. 2, there are shown terminal pins 1 through 8 and an external shield 9 provided for the mini DIN connector.

Figure 3:
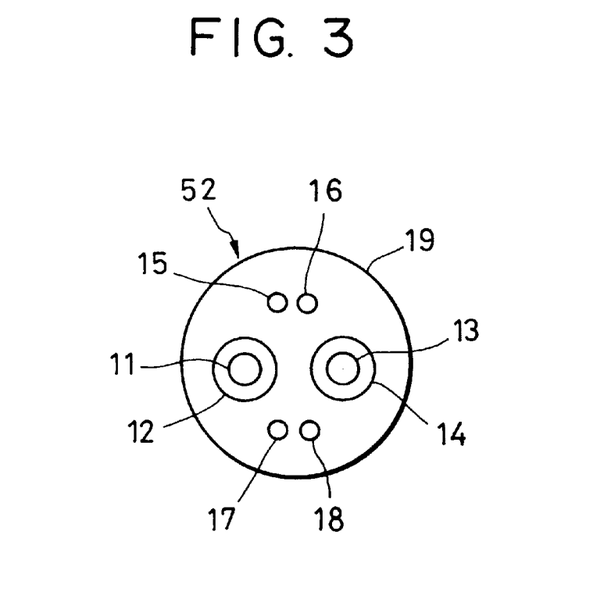
FIG. 3 is a schematic view of a united cable.

FIG. 3 is a schematic view illustrating contents of the united cable 52. The cable 52 has a core 11 of, for example, a 75Ω-coaxial cable line, an external conductor 12 of the coaxial cable, a core 13 and an external conductor 14 of another 75Ω-coaxial cable line, a signal line 15 using, for example, stranded wire, signal lines 16 through 18 which are similar to the line 15, and an external shield 19.

Figure 4:
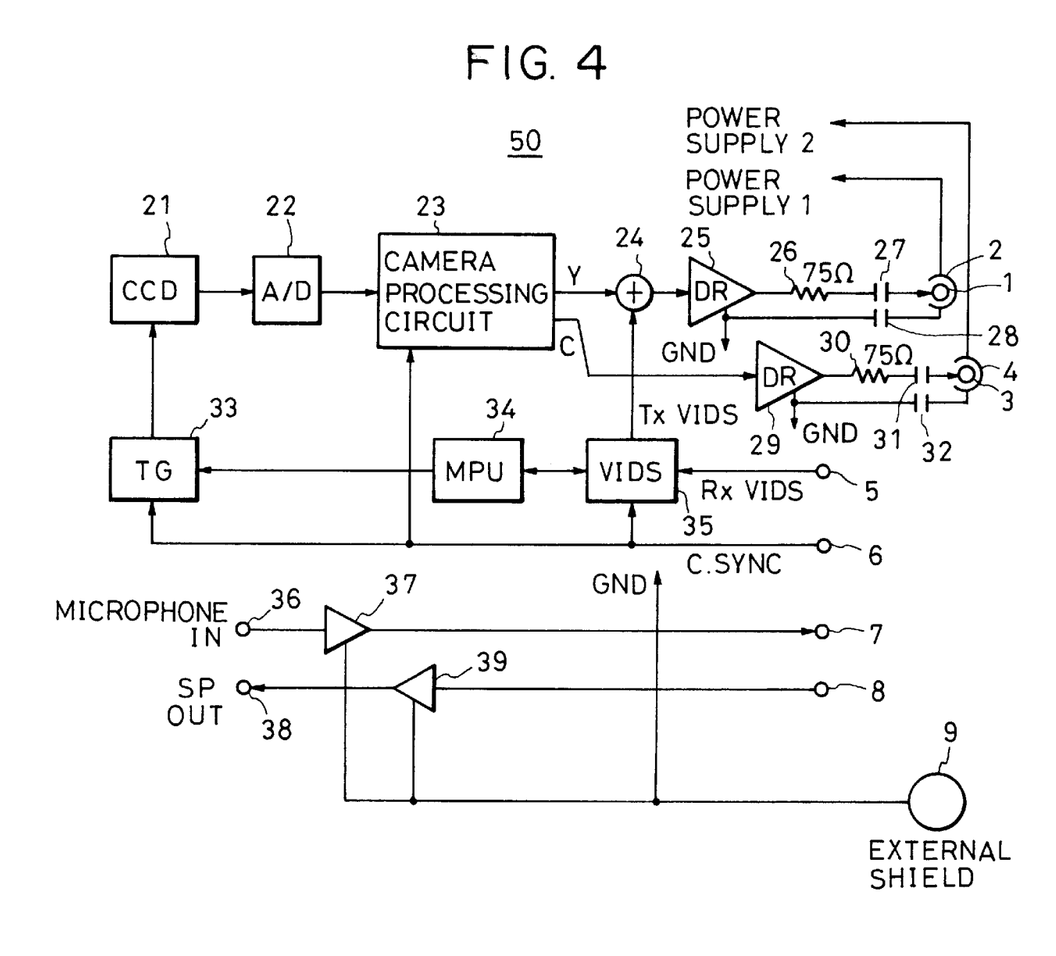
FIG. 4 is a block diagram of the video camera.

FIG. 4 is a block diagram illustrating the internal construction of the video camera 50. The video camera 50 has a charge-coupled device (CCD) 21 serving as an image pickup device, an analog-to-digital (A/D) converter 22, a camera processing circuit 23 used as signal processing means, an adder 24, a 75Ω-drive circuit 25, a 75Ω-resistor 26, a capacitor 27, a capacitor 28 for grounding AC components, a 75Ω-drive circuit 29, a 75Ω-resistor 30, a capacitor 31, and a capacitor 32 for grounding AC components.

The video camera 50 further includes a CCD-driving timing generator 33, a microcomputer 34, a processing circuit (Vertical Interval Data Signal, hereinafter referred to as "VIDS") 35 for transmitting and receiving data only during a vertical blanking interval for video images, a microphone input terminal 36 provided for the video camera 50, an microphone amplifier 37, a speaker output terminal 38 for the video camera 50, and a drive circuit 39. Reference numerals 1 through 9 shown in FIG. 4 correspond to those shown in FIG. 2.

Figure 5:
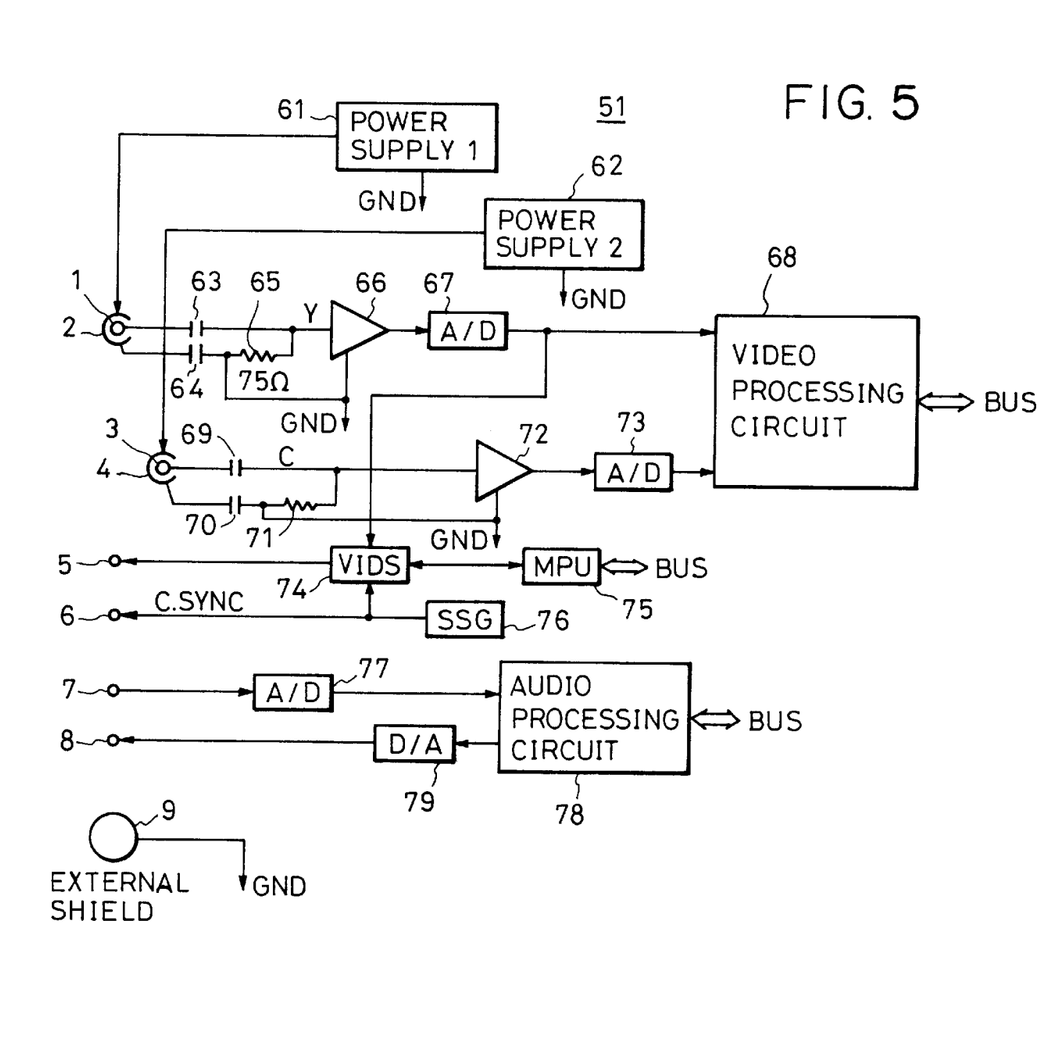
FIG. 5 is a block diagram of the expansion board.

FIG. 5 is a block diagram illustrating the internal configuration of the personal-computer expansion board 51 according to the present invention. The expansion board 51 has a first DC power supply circuit 61 for supplying power to the video camera 50, a second DC power supply circuit 62 similar to the circuit 61, a capacitor 63, a capacitor 64 for grounding AC components, a 75Ω-terminating resistor 65, a video amplifier 66, an A/D converter 67, and a video processing circuit 68 serving as image processing means for compressing video data.

The expansion board 51 further includes a capacitor 69, a capacitor 70 for grounding AC components, a 75Ω-terminating resistor 71, a video amplifier 72, an A/D converter 73, a processing circuit (VIDS) 74 for receiving and transmitting data only during a vertical blanking interval for video images, a microcomputer 75, a synchronizing signal generator 76, an audio A/D converter 77, an audio processing circuit 78 for expanding and compressing audio data, and an audio D/A converter 79. Reference numerals 1 through 9 shown in FIG. 5 are associated with those illustrated in FIG. 2.

The operation of the first embodiment constructed as described above in accordance with the present invention will now be described with reference to FIGS. 1 through 5.

The cover of a predetermined personal computer (not shown) is first opened to insert the expansion board 51 of the present invention into an expansion slot (not shown). The cover is then closed to mate the mini DIN connector (for example, the male type of the connector shown in FIG. 2) provided at one end of the united cable 52 of the present invention and the mini DIN connector (for example, the female type of the connector shown in FIG. 2) disposed on the expansion board 51.

Subsequently, the video camera 50 of the present invention is installed, for example, adjacent the monitor (not shown) of the personal computer, and the mini DIN connector (for example, the female type of the connector illustrated in FIG. 2) provided for the video camera 50 is mated with the mini DIN connector (for example, the male type of the connector shown in FIG. 2) provided at the other end of the united cable 52. Further, the headset 53 is connected to the headset input terminals 36 and 38 (FIG. 4) disposed at the video camera 50. Thus, the connection of the elements of the system shown in FIG. 1 is completed.

Thereafter, power is supplied to the personal computer, and a predetermined software program is installed and run. Then, the expansion board 51 is initialized by the host CPU of the personal computer. Namely, the video processing circuit 68, the microcomputer 75, and the audio processing circuit 78 shown in FIG. 5 are initialized via the respective bus interfaces. In this manner, the microcomputer 75 for the expansion board 51 is ready for receiving commands from the host CPU of the personal computer.

In this condition, the user commands the start of a videoconference by a predetermined operation so as to cause the host CPU to send the microcomputer 75 a predetermined command to switch on the power supply to the video camera 50. In response to this command, the microcomputer 75 transmits a signal indicating an instruction to turn the video camera on to the power supply circuits 61 and 62, thereby outputting a predetermined DC voltage to the terminal pins 2 and 4, respectively, of the 8-pin mini DIN connector (FIG. 2). The DC voltage is further output to the external conductors 12 and 14 (FIG. 3) of the coaxial cable lines of the united cable 52 via the above terminal pins 2 and 4, respectively. The external conductors 12 and 14 are capable of supplying a DC voltage by virtue of the capacitors 64 and 70.

The DC voltage reaches the video camera 50 via the united cable 52 and is applied to the terminal pins 2 and 4 (FIG. 4) of the video camera 50 via the 8-pin mini DIN connector (FIG. 2). In this video camera 50, as well as in the expansion board 51, the external conductors 12 and 14 of the coaxial cable lines are able to supply a DC voltage by the aid of the capacitors 28 and 32 (FIG. 4), thereby making it possible to utilize the DC voltage to power the video camera 50.

According to the above description, DC power is fed to the internal circuit (FIG. 4) of the video camera 50 so as to start the operation. In the above explanation, two DC power supply circuits are simultaneously turned on. The power supply circuits may be, however, sequentially switched on, which is effective for specific cases, such as providing a power-saving wait mode (switching off some of the power sources to enhance power conservation during standby) for the video camera 50.

The video camera 50 is then switched on. Upon completion of the initialization of the microcomputer 34 (FIG. 4) provided for the video camera 50, the microcomputer 75 (FIG. 5) for the expansion board 51 controls the VIDS processing circuit 74 to cause it to send a predetermined command to the terminal pin 5 (FIG. 5). This command is sent only during the vertical blanking interval in order to prevent the entry of noise into video images. The command reaches the terminal pin 5 (FIG. 4) disposed at the video camera 50 via the signal line 15 (FIG. 3) of the united cable 52 and is input into the VIDS processing circuit 35 (FIG. 4) for the video camera 50. The command is further decoded and sent to the microcomputer 34, thereby causing the microcomputer 34 to perform a predetermined corresponding operation.

For returning a response command, the microcomputer 34 controls its VIDS processing circuit 35 to cause it to transmit a predetermined response command to the adder 24 (FIG. 4). In the adder 24, the command is superimposed on an analog luminance signal output from the camera processing circuit 23 during the vertical blanking interval, and the superimposed signal is transmitted to the terminal pin 1 via the 75Ω-drive circuit 25, the 75Ω-resistor 26, and the capacitor 27.

The response command superimposed on the luminance signal (only during the vertical blanking interval) reaches the terminal pin 1 (FIG. 5) provided at the expansion board 51 via the core 11 (FIG. 3) of the coaxial cable line of the united cable 52. The above luminance signal is further transmitted to the A/D converter 67 in which the signal is converted into digital data via the capacitor 63 and the video amplifier 66.

The above response command, which is contained during the vertical blanking interval of the digital data, is decoded by the VIDS processing circuit 74 and is sent to the microcomputer 75 for the expansion board 51. The microcomputer 75 receives the response command and transmits it to the host CPU of the personal computer via the bus interface. Then, the CPU can ascertain that the video camera 50 has been switched on and positively starts the operation.

In the above-described communication control, for achieving noise reduction, it is important to match the two-way vertical blanking intervals between the video camera 50 and the expansion board 51. To meet this requirement, a composite synchronizing signal (C.SYNC) from the synchronizing signal generator 76 (FIG. 5) should be supplied to the terminal pin 6 (FIG. 4) of the video camera 50 from the terminal pin 6 of the expansion board 51 via the signal line 16 (FIG. 3) of the united cable 52 the moment the signal (C.SYNC) is supplied to the VIDS processing circuit 74.

Thus, the composite synchronizing signal (C.SYNC) is also transmitted to the VIDS processing circuit 35, the CCD-driving timing generator 33, and the camera processing circuit 23 provided for the video camera 50. Therefore, the two-way vertical blanking intervals are synchronized, i.e., the two-way intervals containing the control data are matched.

Once the video camera 50 is switched on and the two-way communication control is established between the video camera 50 and the expansion board 51, various camera control operations, such as pan and tilt control for the pan-tilt mechanism (not shown), and an iris control for the camera, can be achieved by an operation similar to the aforedescribed operation.

An explanation will now be given of the operation of the video system.

A video signal from the CCD 21 (FIG. 4) is converted into digital data by the A/D converter 22 and is fed to the camera processing circuit 23 serving as signal processing means. In the camera processing circuit 23, predetermined color processing and white balance control are performed on the data, for example, in a digital manner. The data is then converted into an analog signal by a built-in D/A converter, and is output as a luminance signal Y and a chrominance signal C. The luminance signal Y is sent to the adder 24 in which control data from the VIDS processing circuit 35 is superimposed on the luminance signal Y during the vertical blanking interval.

The luminance signal Y superimposed by the control data is then output from the terminal pin 1 via the 75Ω-drive circuit 25, the 75Ω-resistor 26, and the capacitor 27. The return signal from the above superimposed luminance signal Y returns to a GND of the 75Ω-drive circuit 25 from the terminal pin 2 via the capacitor 28. The "go" and "return" components of the signal form a pair with respect to alternating currents of the superimposed luminance signal Y, and the AC-component pair is transmitted in the core 11 and the external conductor 12 (FIG. 3) of the 75Ω-coaxial cable line of the united cable 52.

The AC-component pair of the superimposed luminance signal reaches the terminal pins 1 and 2 of the expansion board 51 via the united cable 52, and are further supplied to the input terminal and the GND of the video amplifier 66 via the capacitors 63 and 64, respectively. The luminance signal Y correctly transmitted with 75Ω is amplified by the video amplifier 66 to a predetermined magnitude, and is then converted into digital data by the A/D converter 67. The digital data is then sent to the video processing circuit 68 serving as image processing means in which the image data is compressed to small-capacity data. The data is then transmitted to the host CPU via the bus interface.

Meanwhile, the chrominance signal C output from the camera processing circuit 23 (FIG. 4) of the video camera 50 is processed in a manner similar to the luminance signal Y, except that control data is not superimposed on the chrominance signal C during the vertical blanking interval. More specifically, the signal C is transmitted to the video processing circuit 68 serving as image processing means of the expansion board 51 via the capacitors 69 and 70, the amplifier 72, and the A/D converter 73, and is compressed in the processing circuit 68.

The operation of the sound system will now be explained.

A microphone output signal from the headset 53 is fed to the microphone amplifier 37 of the video camera 50 via the microphone input terminal 36. The output of the microphone amplifier 37 is then transmitted via the terminal pin 7 and reaches the terminal pin 7 (FIG. 5) of the expansion board 51 via the signal line 17 (FIG. 3) of the united cable 52. This sound signal is converted into digital data by the A/D converter 77. The digital data is then sent to the audio processing circuit 78 and is compressed in a predetermined manner to small-capacity data. The compressed data is then transmitted to the host CPU via the bus interface.

In contrast, sound data transmitted from a distal end through the videoconference system and received from the host CPU via the bus interface is expanded by the audio processing circuit 78 and is output to the D/A converter 79. The expanded data is then reconverted into an analog audio signal in the D/A converter 79 and is output to the terminal pin 8. The data reaches the terminal pin 8 (FIG. 4) of the video camera 50 via the signal line 18 (FIG. 3) of the united cable 52. After the sound signal is amplified by the speaker-driving amplifier 39 to a predetermined magnitude, it is transmitted to the headset 53 via the terminal 38 and is reproduced by the speakers (headphones) in the headset 53.

As discussed above, in this embodiment only a single cable is used for connecting the video camera 50 and the expansion board 51, and DC power and all the signals, such as video signals, control signals, and sound signals, are allowed to pass through this cable. Thus, the major wiring for interconnecting the video camera 50 and the expansion board 51 of the desktop videoconference system requires only one cable. In this embodiment, this cable is referred to as "the united cable 52", and mini DIN connectors are cost-effectively used for the united cable 52, and more particularly, 8-pin mini DIN connectors are used because 4 and 8-pin mini DIN connectors are the least expensive and most commonly used among 3, 4, 5, 6, 7, 8-pin mini DIN connectors. It should be noted that cost reduction can be achieved because 4-pin mini DIN connectors are employed in an S video cable, and 8-pin mini DIN connectors are used for RS232C connectors.

The united cable 52 using the above-described 8-pin mini DIN connectors is constructed in the following manner.

(1) Two coaxial cable lines are respectively used to allow the passage of two types of video signals, i.e., luminance signals Y and chrominance signals C, through the cores of the coaxial cable lines. The external conductors of the coaxial cable lines are used in such a manner that AC components are grounded.

(2) DC power is supplied to the external conductors of the coaxial cable lines, and the external shield 19 is used as a GND for the DC power supply.

(3) The control signals include three types of signals, i.e., synchronous clock, Rx, and Tx, based on synchronous serial transmission. Among these signals, Tx signals transmitted from the video camera 50 are multiplexed during the vertical blanking interval of the above-described video signals, for example, the luminance signals Y. The remaining synchronous clock and Rx signals to be output to the video camera 50 pass through two signal lines. The external shield 19 of the united cable 52 is used as a GND for the two signals.

(4) Two signal lines are used for sound signals, for example, microphone signals and speaker signals. The external shield 19 of the united cable 52 is employed as a GND for these signals.

In summary, 6 pins formed of two coaxial cable lines and two signal lines are allocated to DC power, video signals and the control system, while 2 pins are used for the sound system; in total, 8 pins are required to attain the whole system, and 8-pin mini DIN connectors are thus usable for the united cable 52.

Figure 6:
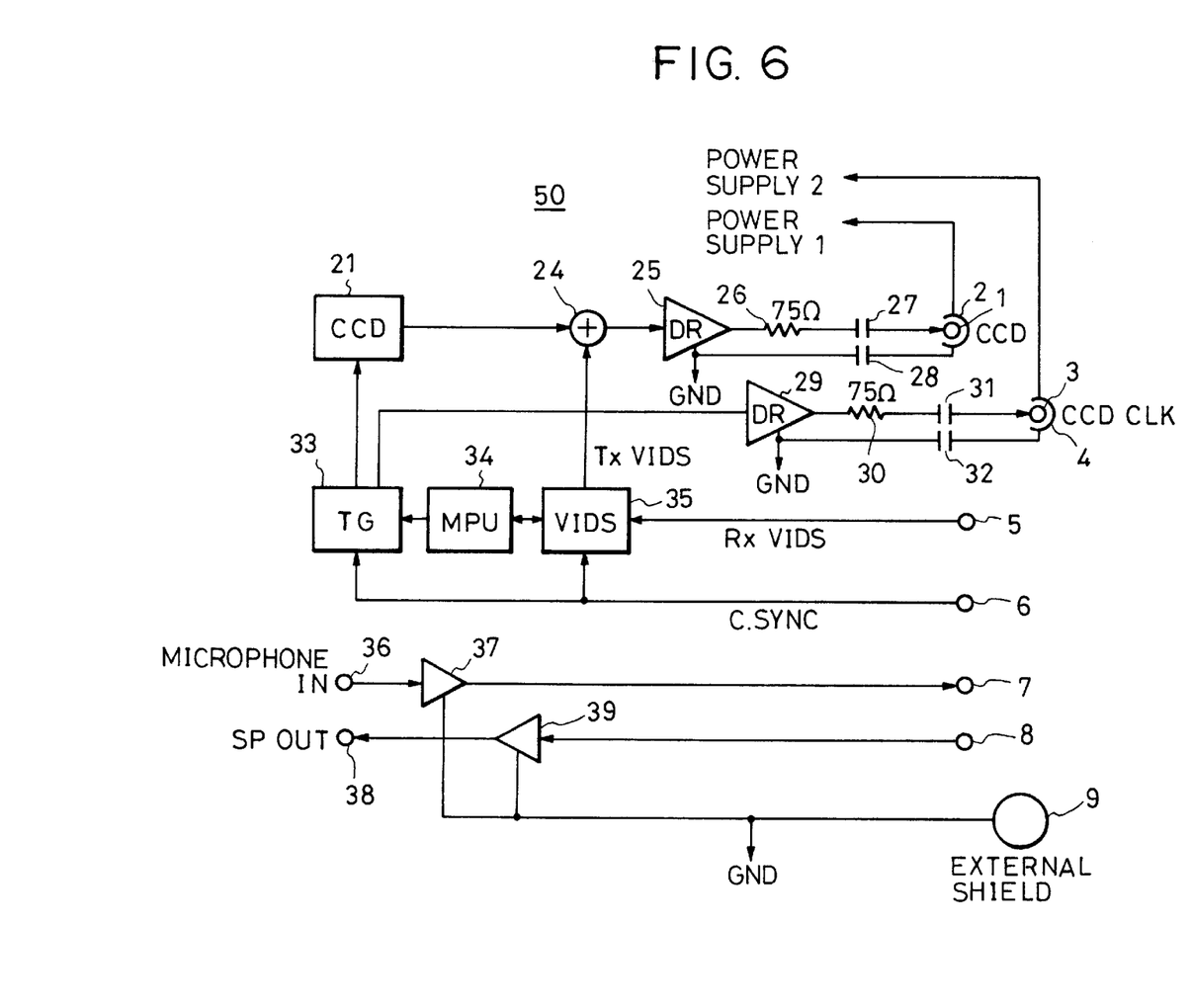
FIG. 6 is a block diagram of the video camera according to a second embodiment of the present invention.
Figure 7:
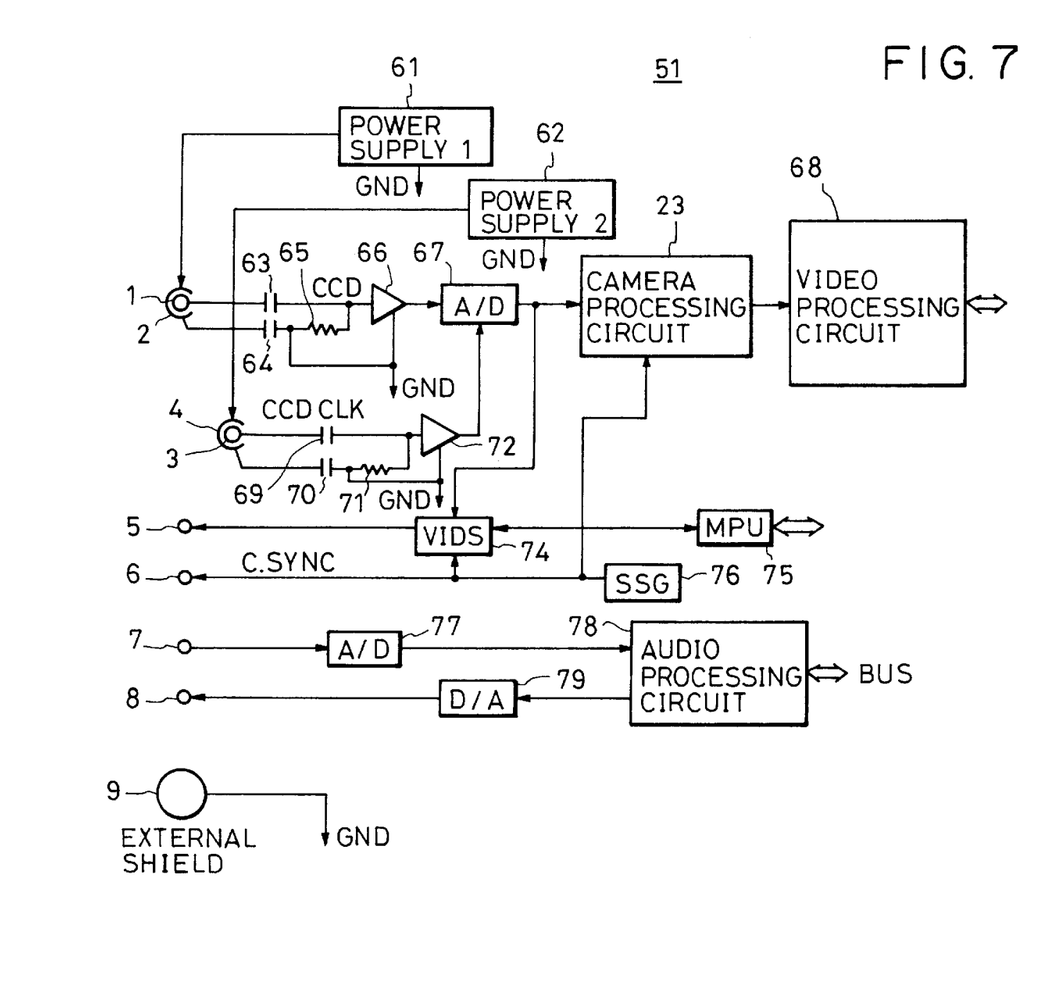
FIG. 7 is a block diagram of the expansion board according to the second embodiment of the present invention.

FIG. 6 is a block diagram of the video camera 50 according to a second embodiment of the present invention. FIG. 7 is a block diagram illustrating the expansion board 51 of the second embodiment.

The second embodiment differs from the first embodiment in the following points. An output signal of the CCD 21 (FIG. 6) is directly used in place of the luminance signal Y, and control data is superimposed on the output signal during the vertical blanking interval. Further, instead of using the chrominance signal C, a "CCD-signal sampling clock" output from the timing generator 33 (FIG. 6) is used.

More specifically, referring to the block diagram of the video camera 50 shown in FIG. 6, the output signal from the CCD 21 is transmitted to the adder 24 in which the control data is superimposed on the signal during the vertical blanking interval. On the other hand, the CCD-signal sampling clock from the timing generator 33 is sent to the 75Ω-drive circuit 29. The CCD signal is then transmitted to the A/D converter 67 of the expansion board 51 shown in FIG. 7 via the united cable 52. Meanwhile, the sampling clock (CCDCLK) is transmitted to the A/D converter 67 via the video amplifier 72. The output digital data from the A/D converter 67 is then sent to the camera processing circuit 23 in which predetermined color processing and white balance control are performed in a digital manner. Namely, the second embodiment can be greatly differentiated from the first embodiment in that camera processing, i.e., signal processing, is executed in the expansion board 51, and not in the video camera 50 as in the first embodiment.

Figure 8:
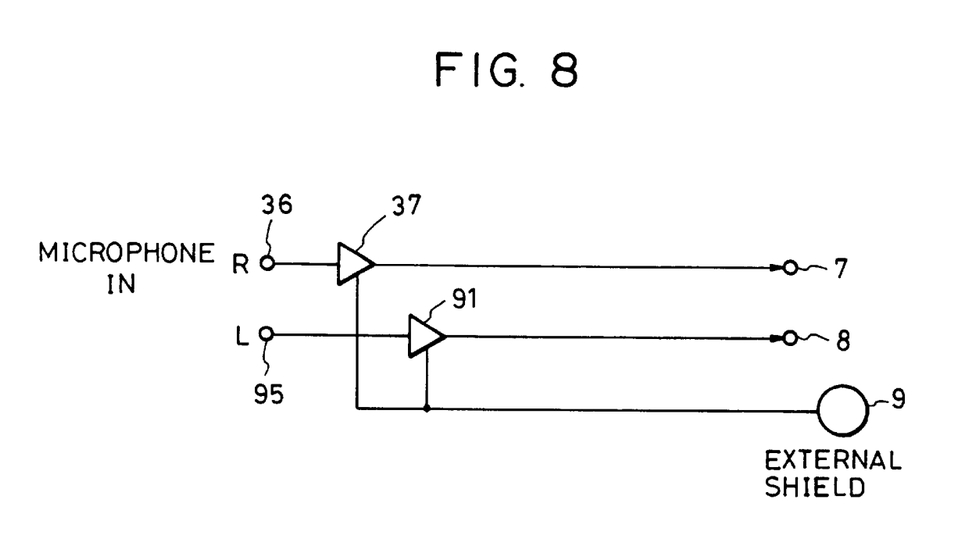
FIG. 8 is a block diagram of a sound system according to a third embodiment of the present invention.

FIG. 8 is a block diagram illustrating the sound system of the video camera 50 according to a third embodiment of the present invention. The third embodiment is different from the first and second embodiments in that the speaker-driving amplifier 39 (FIGS. 4 and 6) within the video camera 50 is replaced by a microphone amplifier 91 (FIG. 8) to implement a stereo system.

Figure 9:
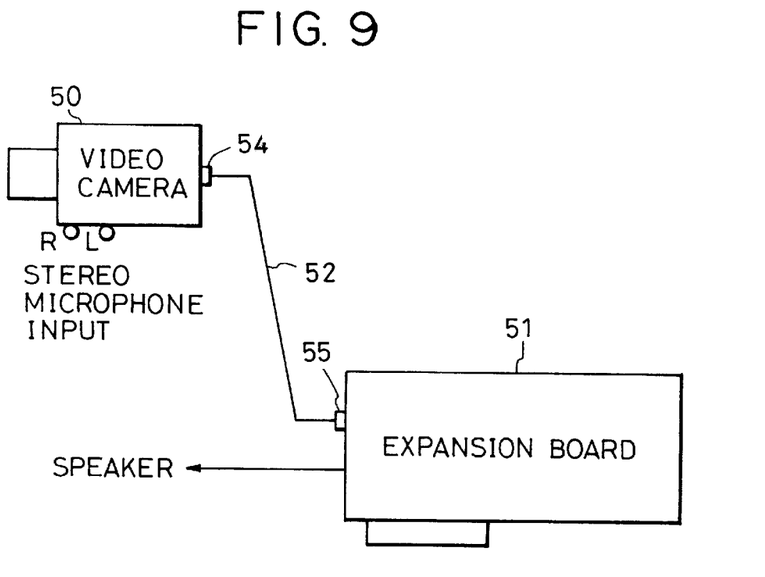
FIG. 9 is a block diagram illustrating the third embodiment.

The connecting state of the third embodiment is shown in FIG. 9. The use of the headset 53 shown in FIG. 1 is traded off for implementing a microphone stereo system.

According to the aforedescribed embodiments, the following advantages can be presented.

(1) All of the power supply cable, the control data cable, the video cable, and the sound cable are integrated so that only one cable is required to connect the video camera 50 and the expansion board 51, thereby improving reliability and external appearance from an aesthetic point of view.

(2) For performing camera control, there is no need to use an RS232C terminal of a personal computer, and the RS232C terminal can be accordingly allocated to another device, such as a modem or a printer.

(3) An AC adapter can be eliminated since power to the video camera 50 can be supplied from the expansion board 51. Thus, system cost can be reduced, and there is no possibility of forgetting to switch the video camera 50 on, thereby enhancing ease of operation.

(4) The headset 53 is connected not to the expansion board 51 but to the video camera 50. Accordingly, the headset 53 is easy to attach, and when not in use, easy to disconnect from the video camera 50 and accommodate.

(5) In the second embodiment, camera processing, i.e., signal processing, can be executed by the expansion board 51. This makes it possible to reduce the size of the video camera 50 and also requires only one video A/D converter (three in the first embodiment), thereby reducing the cost.

As is seen from the foregoing description, the present invention offers the following advantages.

According to an embodiment of the present invention, power-supply voltages, control signals, sound signals, and video signals can be transmitted through only one cable, thereby improving reliability and external appearance from an aesthetic point of view.

According to an embodiment of the present invention, since there is no need to use an RS232C terminal of a personal computer in order to receive control signals, the RS232C terminal can be allocated to other devices. Moreover, an AC adapter for receiving the power supply is not required. This reduces cost and eliminates the possibility of forgetting to switch the power on, thereby enhancing ease of operation.

Further, first and second terminals for inputting and outputting sound signals and processing means, such as amplifying means, are provided for the image pickup apparatus. This makes it possible to connect the headset to the image pickup apparatus, thereby enhancing ease of operation.

Additionally, signal processing means may be disposed in the image processing apparatus, thereby downsizing the image pickup apparatus.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image pickup apparatus comprising:
    image pickup means for picking up an image of an object and outputting a video image signal corresponding thereto;
    a first terminal for receiving a first control signal;
    a second terminal for receiving a synchronizing signal;
    control means, coupled to said first and second terminals, for generating a second control signal based on the received first control signal and the synchronizing signal, and for performing image processing control for said apparatus;
    adding means, coupled to said image pickup means and to said control means, for adding the second control signal to the video image signal;
    a third terminal, coupled to said adding means, for outputting the video image signal to which the second control signal is added;
    a fourth terminal for receiving a power supply voltage; and
    a cable having at both ends connector means so as to connect a corresponding pair of terminals respectively selected from said first through said fourth terminals and a fifth through an eighth terminal of an image processing apparatus,
    wherein said cable comprises one cable having two coaxial cable lines, four signal lines, and an external shield line, and wherein said first through fourth connector means each comprises eight pin terminals and an external shield shell.

2. An image pickup apparatus according to claim 1, further comprising:
    fifth and sixth terminals for receiving first and second sound signals, respectively;
    first and second sound-processing means, coupled to said fifth and sixth terminals, for processing the received first and second sound signals, respectively; and
    seventh and eighth terminals, coupled to said first and second sound-processing means, for outputting the processed first and second sound signals, respectively.

3. An image pickup apparatus according to claim 1, further comprising a capacitor connected between said fourth terminal and a reference potential so as to allow a return signal of a video image signal from an external source to pass through said capacitor.

4. An image pickup apparatus according to claim 1, further comprising signal processing means, coupled between said image pickup means and said adding means, for processing the video image signal and transmitting it to said adding means.

5. An image pickup system according to claim 1, wherein, among said four signal lines, two are used for transmitting and receiving sound signals, one is used for transmitting and receiving a composite synchronizing signal, and one is used for transmitting and receiving a control signal during the vertical blanking interval; and wherein said vertical blanking interval control signal passes through a core of one of said coaxial cable lines in a superimposed manner during the vertical blanking interval.

6. An image pickup system according to claim 5, wherein DC power is carried between the extended conductors of the coaxial cable lines and an external shield line.

7. An image pickup system according to claim 5, wherein a luminance signal is transmitted through the first coaxial cable line, and wherein a chrominance signal is transmitted through the second coaxial cable line.

8. An image pickup system according to claim 5, wherein said video signal output is transmitted through the first coaxial cable line, and wherein an image pickup means clock signal is transmitted through the second coaxial cable line.

9. An image pickup system according to claim 1, wherein said cable comprises one cable having two coaxial cable lines, four signal lines, and an external shield line, and wherein said cable comprises eight pin terminals and an external shield shell.

10. An image processing apparatus comprising:
    a first terminal for receiving a video image signal;
    image processing means, coupled to said first terminal, for processing the received video image signal;
    synchronizing-signal generating means for generating a synchronizing signal;
    a second terminal, coupled to said synchronizing-signal generating means, for outputting the synchronizing signal;
    control means, coupled to said synchronizing-signal generating means, for generating a control signal based on the synchronizing signal, and for performing image processing control for said apparatus;
    a third terminal, coupled to said control means, for outputting the control signal;
    power supply means for supplying a power supply voltage;
    a fourth terminal, coupled to said power supply means, for outputting the power supply voltage; and
    a cable having at both ends connector means so as to connect a corresponding pair of terminals respectively selected from said first through said fourth terminals and a fifth through an eighth terminal of an image pick-up apparatus,
    wherein said cable comprises one cable having two axial cable lines, four signal lines, and an external shield line, and wherein said first through fourth connector means each comprises eight pin terminals and an external shield shell.

11. An image processing apparatus according to claim 10, further comprising:
    a fifth terminal for receiving a first sound signal;
    sound-processing means, coupled to said fifth terminal, for processing the first sound signal and outputting a second sound signal; and
    a sixth terminal, coupled to said sound-processing means, for outputting the second sound signal.

12. An image processing apparatus according to claim 10, further comprising a capacitor disposed between said fourth terminal and a reference potential.

13. An image processing apparatus according to claim 10, further comprising signal processing means, coupled between said first terminal and said image processing means, for processing the video image signal and transmitting it to said image processing means.

14. An image pickup system according to claim 10, wherein said cable comprises one cable having two coaxial cable lines, four signal lines, and an external shield line, and wherein said cable comprises eight pin terminals and an external shield shell.

15. An image pickup system comprising:

an image pickup apparatus including (i) image pickup means for picking up an image of an object and outputting a video image signal corresponding thereto, (ii) a first terminal for receiving a first control signal, (iii) a second terminal for receiving a synchronizing signal, (iv) first control means, coupled to said first and second terminals, for generating a second control signal based on the received first control signal and the synchronizing signal, and for performing image processing control for said image pickup apparatus, (v) adding means, coupled to said image pickup means and to said control means, for adding the second control signal to the video image signal, (vi) a third terminal, coupled to said adding means, for outputting the video image signal to which the second control signal is added, (vii) a fourth terminal for receiving a power supply voltage, and (viii) first connector means including said first through fourth terminals;

an image processing apparatus including (i) a fifth terminal for receiving the video image signal to which the second control signal is added, (ii) image processing means, coupled to said fifth terminal, for processing the received video image signal, (iii) synchronizing-signal generating means for generating a synchronizing signal, (iv) a sixth terminal, coupled to said synchronizing-signal generating means for outputting the synchronizing-signal generating means, for generating a third control signal based on the synchronizing signal, and for performing image processing control for said image processing apparatus, (vi) a seventh terminal, coupled to said control means, for outputting the third control signal, (vii) power supply means for supplying a power supply voltage, (viii) an eighth terminal, coupled to said power supply means, for outputting the power supply voltage, and (ix) second connector means including said fifth through eighth terminals; and a cable having at both ends third and fourth connector means respectively coupled to said first and second means so as to connect a corresponding pair of terminals respectively selected from said first through fourth terminals and said fifth through eighth terminals, wherein said cable comprises one cable having two axial cable lines, four signal lines, and an external shield line, and wherein said first through fourth connector means each comprises eight pin terminals and an external shield shell.

16. An image pickup system according to claim 15, wherein said image pickup apparatus comprises (i) ninth and tenth terminals for receiving first and second sound signals, respectively, (ii) first and second sound-processing means, coupled to said ninth and tenth terminals, for processing the received first and second sound signals, respectively, and (iii) eleventh and twelfth terminals, coupled to said first and second sound-processing means, for outputting the processed first and second sound signals, respectively.

17. An image pickup system according to claim 15, wherein said image pickup apparatus comprises a capacitor connected between said fourth terminal and a reference potential so as to allow a return signal of a video image signal from an external source to pass through said capacitor.

18. An image pickup system according to claim 15, wherein said image pickup apparatus further comprises first signal processing means, coupled between said image pickup means and said adding means, for processing the video image signal and transmitting it to said adding means.

19. An image pickup system according to claim 15, wherein said image processing apparatus comprises (i) a thirteenth terminal for receiving a first sound signal, (ii) third sound-processing means, coupled to said thirteenth terminal, for processing the first sound signal and outputting a second sound signal, and (iii) a fourteenth terminal, coupled to said third sound-processing means, for outputting the second sound signal.

20. An image pickup system according to claim 15, wherein said image processing apparatus further comprises a capacitor disposed between said eighth terminal and a reference potential.

21. An image pickup system according to claim 15, wherein said image processing apparatus further comprises second signal processing means, coupled between said fifth terminal and said image processing means, for processing the received video image signal and transmitting it to said image processing means.

* * * * *

UNITED STATES PATENT AND TRADEMARK OFFICE
CERTIFICATE OF CORRECTION

PATENT NO.    : 6,266,084 B1
DATED         : July 24, 2001
INVENTOR(S)   : Tsuguhide Sakata Page 1 of 1

It is certified that error appears in the above-identified patent and that said Letters Patent is hereby corrected as shown below:

<u>Title page,</u>
Item [56], References Cited, FOREIGN PATENT DOCUMENTS,
"184072" should read -- 61-184072 --; and
"362067975A" should read -- 62-362067975A --.

<u>Column 14,</u>
Line 1, "means" should read -- connector means --.

Signed and Sealed this

Ninth Day of April, 2002

Attest:

Attesting Officer

JAMES E. ROGAN
*Director of the United States Patent and Trademark Office*